TRANSMITTER

Filed April 10, 1957 2 Sheets-Sheet 1

INVENTOR.
MAX S. FERYSZKA

BY Charles H. Brown

ATTORNEY

Sept. 26, 1961 M. S. FERYSZKA 3,002,161

TRANSMITTER

Filed April 10, 1957 2 Sheets-Sheet 2

INVENTOR.
MAX S. FERYSZKA
BY Charles H. Brown
ATTORNEY

United States Patent Office 3,002,161

Patented Sept. 26, 1961

3,002,161
TRANSMITTER

Max S. Feryszka, Haddonfield, N.J., assignor to Radio Corporation of America, a corporation of Delaware Filed Apr. 10, 1957, Ser. No. 651,872
10 Claims. (Cl. 332—45)

The invention relates to transmitters and particularly to single sideband transmitters.

In comparing single sideband systems such as carrier suppressed single sideband systems and double sideband systems, a gain in signal-to-noise ratio of nine db has been reported for single sideband systems over double sideband systems. It is known that single sideband systems have other advantages such as more effective and efficient use of the frequency spectrum.

The intelligence in a single sideband signal is transmitted by varying two components of the transmitted wave, namely the amplitude and the phase. The phase variations carry a large number of sidebands with distinct bundles of energy. The amplitude modulation determines the total energy given to the entire signal at any instant of time, and also neutralizes some of the sidebands and reinforces others.

A single sideband transmitter has been developed which eliminates the need for complex and costly equipment such as linear radio frequency amplifiers. A portion of a single sideband wave to be amplified is passed through limiting stages, thereby removing the amplitude modulation component and producing the pure phase modulation component. The original single sideband wave amplitude modulation envelope is detected and the resultant audio frequency wave is amplified. The amplified detected amplitude modulation envelope then remodulates, in a final stage, the amplified phase modulation component, resulting in an amplified copy of the original single sideband wave. If the phase and amplitude modulation components are recombined in proper phase and with proper amplitudes, the undesired sidebands of the phase and amplitude modulation components will cancel, reproducing the single sideband wave form. A single sideband transmitter of the type just described is shown and described in United States Patent 2,666,133, issued to L. R. Kahn on January 12, 1954, for Single Sideband Transmitter.

An object of the invention is to provide an improved single sideband transmitter of the type in which the phase and amplitude modulation components of a single sideband signal are amplified over separate paths and then recombined to produce an amplified copy of the single sideband signal.

Another object is to devise a novel system by means of which a single sideband transmitter can be adapted to transmit in an improved manner signal energy such as voice signals in which the amount of energy transmitted in a given time may vary, as compared to the operation of single sideband transmitters using known systems.

A further object is to devise a novel system for use in a single sideband transmitter and which has the proper electrical characteristics to permit the use of a negative feedback arrangement for correcting envelope distortion in the single sideband transmitter output signal.

Briefly, the objects of the invention are accomplished by a single sideband transmitting system in which a portion of a single sideband signal or wave to be amplified is passed through one or more stages of limiters, thereby eliminating the amplitude modulation component or envelope and producing the pure, amplified phase modulation component of the single sideband signal. The original single sideband signal amplitude modulation envelope is detected and is passed through one or more stages of amplifiers. The amplifier stages are all arranged to operate as D.C. (direct current) amplifiers so that the intelligence in the amplitude modulation component as to the average amplitude thereof is retained. The amplified detected amplitude modulation envelope including the average amplitude or D.C. component thereof remodulates, in a power amplifier, the amplified phase modulation component, resulting in an amplified copy of the original single sideband wave.

A negative feedback is provided which functions to correct envelope distortion resulting from the operation of the power amplifier. A true, amplified copy of the original single sideband wave is obtained whether a single sideband transmitter including the invention be used to transmit signal energy in which the average amplitude is constant over a given period of time, say 0.1 second or more, or is used to transmit signal energy in which the average amplitude varies, as in voice transmission.

A more detailed description of the invention will now be given with reference to the accompanying drawing, in which.

Figure 1:
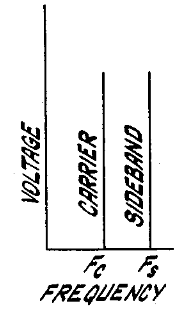
FIGURES 1 and 2 are diagrams useful in reviewing the characteristics of a single sideband wave.
Figure 2:
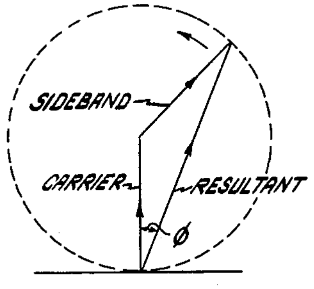

Referring to FIGURES 1 and 2, it may be helpful to review briefly the characteristics of a single sideband wave. FIGURE 1 shows the spectral distribution of a single sideband wave having equal carrier and sideband amplitudes. The upper sideband is shown and represents, for example, a signal frequency of 600 cycles, so that the sideband $F_s$ is 600 cycles higher than the carrier $F_c$ on the frequency axis.

FIGURE 2 is a vector representation of the single sideband wave represented in FIGURE 1. The carrier frequency is the reference vector. Thus, the sideband vector revolves past the reference vector at a velocity corresponding to the tonal frequency of the signal, which is 600 cycles in the example given. If one considers the resultant of the sideband and carrier vectors, it may be seen that such resultant will vary both in amplitude and angular velocity. Therefore, a single sideband wave has both amplitude and phase modulation components.

Figure 3:
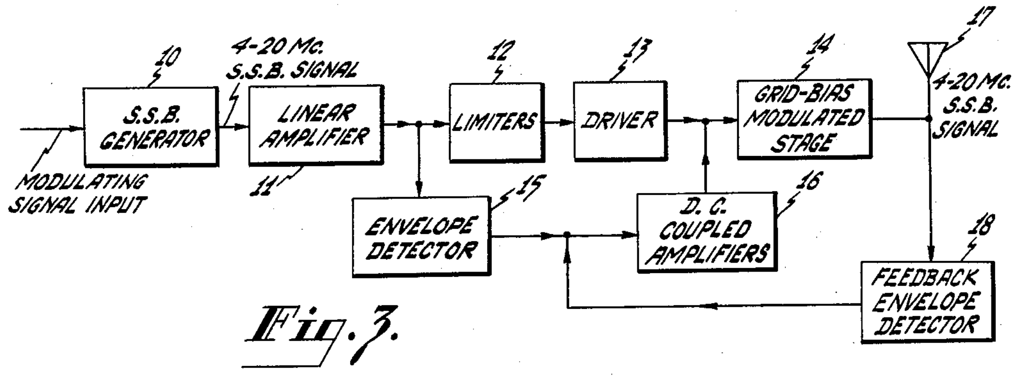
FIGURE 3 is a block diagram of a single sideband transmitter according to the invention.

FIGURE 3 represents a block diagram of a system according to the invention which was actually constructed and tested. A modulating signal of any desired type is applied to the input of a single sideband generator 10. For example, such modulating signal input may consist of two or more multiplexed audio tones, each of which is shifted in frequency in accordance with the intelligence in the corresponding multiplex channel. The generator 10 produces single sideband tone frequencies from the input audio tones and may consist of one or more balanced modulators supplied with the audio input tones and with locally-generated wave energy. Bandpass filters are provided for selecting one or the other of the sidebands produced in the modulators. The single sideband generator 10 is designed to produce a selected single sideband wave at the final frequency of the single sideband transmitter. For example, the output frequency of the generator 10 may be in the range of 4–20 mc. (megacycles), plus or minus the audio tone frequencies according to whether the upper or lower sideband is selected. The generator 10 may be designed to produce a single sideband signal with or without the carrier. While the invention is particularly suitable for use in a suppressed carrier single sideband system, it may be used in a system in which the carrier is also transmitted. While the operation of the invention will be described in connection with single sideband operation, it is adaptable for use in any system in which a signal to be amplified includes phase and/or amplitude modulation components such as, for example, a suppressed carrier double sideband system.

The single sideband signal output of the generator 10 is fed through a linear radio frequency amplifier 11. The output signal of the linear amplifier 11 is fed to two separate channels. One of the channels may be designated as the phase modulation channel and the other channel may be designated as the amplitude modulation channel. The phase modulation channel includes several stages of limiters 12 to which is fed the amplified single sideband signal output of the amplifier 11. The limiters 12 function to produce the pure, phase modulation component of the single sideband signal, eliminating the amplitude modulation component thereof. The phase modulation component is fed from the limiters 12 to a driver 13 and, thereafter, to a grid-bias modulated output stage 14.

The amplitude modulation channel includes an amplitude modulation or envelope detector 15, which is preferably of the diode vacuum tube type. The linear detector 15 functions to rectify the single sideband wave and to remove the audio envelope therefrom, thus isolating the amplitude modulation component from the phase modulation component of the single sideband wave. The output of detector 15 corresponds to the envelope wave shape of the single sideband wave at the output of the generator 10. In order to retain the intelligence in the amplitude modulation component as to the average amplitude thereof, in other words the unidirectional or D.C. component, the amplitude modulation component is direct coupled through several stages of D.C. coupled linear amplifiers 16. The amplified, amplitude modulation component including the D.C. component is then directly coupled from the D.C. coupled amplifiers 16 to the grid-bias modulated stage 14, as a variable grid bias.

The amplified, amplitude modulation component including the D.C. component modulates the amplified, phase modulation component in the grid-bias modulated stage 14. The envelope wave shape or amplitude modulation component at the output oft he D.C. coupled amplifiers 16 is the same as the envelope wave shape at the output of the generator 10. The phase modulation component at the output of driver 13 is identical with the phase modulation component at the output of the generator 10. If the time relationship between the phase and amplitude modulation components are properly maintained, a pure, high-power single sideband signal appears at the output of the grid-bias modulated stage 14 which is an amplified copy of the single sideband wave appearing at the output of the generator 10. The amplitude modulation and phase modulation components retain the original phase relationship of the single sideband wave. Under these conditions, sufficient amplitude modulation is effected in the modulated stage 14 to reproduce the form of the original single sideband signal, thus cancelling spurious sidebands introduced when the single sideband signal is divided into its two components. The output signal of the modulated stage, having the same frequency as the output signal of the generator 10, may be transmitted by a suitable transmitting antenna 17 which is coupled to the output of the modulated stage 14.

By using a direct coupled grid-bias modulated stage 14, the invention is capable of operation in an optimum manner for different kinds of signal energy. If the average amplitude of the signal energy to be transmitted remains constant over a certain interval of time (say 0.1 second or more), as in a frequency-shifted frequency division multiplex signal, the cancellation of the undesired sidebands in the phase modulated spectrum will take place by means of similar but opposite sideband components produced by the amplitude modulation in the modulated stage 14. A proper, amplified copy of the single sideband signal to be transmitted is produced.

If, on the other hand, the average amplitude of the amplitude modulation component varies, as in voice transmission, a similar cancellation of the undesired sidebands takes place. This is so because the stage 14 is grid modulated by the amplitude modulation component including the average amplitude or D.C. component. The average level of the grid bias voltage is a function of the average amplitude of the amplitude modulation component. The undesired sidebands will remain balanced at the output of the modulated stage 14. An amplified single sideband signal is produced at the output of the modulated stage 14 in which the average amplitude varies in exactly the same manner as does the average amplitude of the original single sideband signal at the output of the generator 10, resulting in the transmission of a proper and desirable signal.

It is a feature of the invention that the selected single sideband signal at the output of the generator 10 and which is divided into the phase modulation and amplitude modulation channels is at the final frequency of the transmitter. The values of the components included in each channel can be chosen such that both channels are broadband to insure the undistorted passage of all the information contained in the amplitude and phase modulation components. An advantage of the invention is the resulting ease of adjustments of all radio frequency stages. As all stages are not critical to adjust, the adjustments necessary to maintain the proper time relationship between the phase and amplitude modulation components can be made without great difficulty. In any system which uses parallel channels for transmission of information, phase coincidence in the channels is of prime importance to avoid the production of high spurious radiations. This requirement is readily met by the invention since both channels can be made sufficiently broadband to permit the undistorted passage of the amplitude and phase modulation components therethrough. The use of the broadband amplitude modulation component channel permits the invention to be readily adaptable for a negative or degenerative feedback control, without creating problems of critical adjustments. The amplitude modulation component or envelope of the modulated stage 14 output signal is detected by a feedback envelope detector 18, and a negative feedback is applied to the D.C. coupled amplifiers 16. Any amplitude distortion generated within the stage 14 and caused by the nonlinear characteristics thereof is by this action greatly reduced, if not eliminated.

Figure 4:
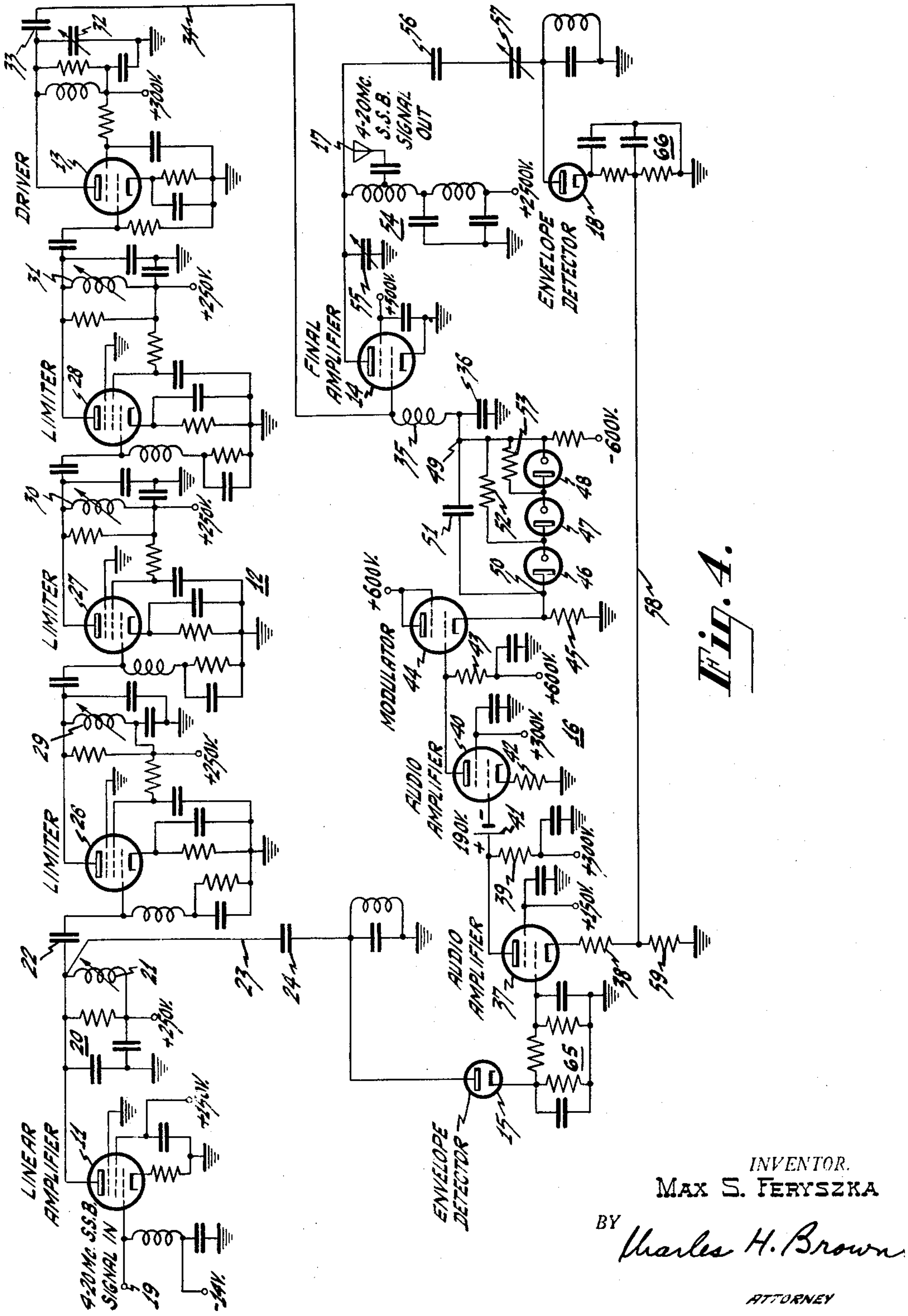
FIGURE 4 is a circuit diagram of one embodiment of the invention according to the block diagram given in FIGURE 3.

FIGURE 4 is a circuit diagram of one embodiment of the invention constructed according to the block diagram given in FIGURE 3. For ease of description, the various components in FIGURE 4 will be identified by the corresponding reference numerals used in FIGURE 3 wherever possible. To assist in an understanding of the invention, voltage values have been assigned to various positive and negative terminals connected to suitable sources of potential and arranged in the circuit diagram. The values, however, are given by way of example only and can be altered to meet the requirements of a particular application without departing from the spirit of the invention.

A selected single sideband signal to be transmitted is fed from the generator 10 shown in FIGURE 3 to an input terminal 19. The signal which may or may not include the carrier according to the particular application is fed from the terminal 19 to the linear radio frequency amplifier 11 which is biased for class A operation. The amplifier 11 acts as a decoupling circuit in that it prevents undesired loading of the generator 10. The output circuit of the amplifier 11 includes a resonant circuit 20 tuned by a variable inductor 21 to pass the selected single sideband signal. The selected single sideband signal is fed from the resonant circuit 20 to the phase modulation component channel over an electrical path including an R.F. (radio frequency) coupling capacitor 22 and to the amplitude modulation component channel over an electrical path including lead 23 and R.F. coupling capacitor 24.

The phase modulation component channel includes three stages of limiters 26, 27 and 28, each of which is tuned by a variable inductor 29, 30 and 31, respectively. The limiters 26, 27 and 28 function in a conventional manner to eliminate the amplitude modulation component or envelope from the signal applied thereto and are generally known in the art as overdriven amplifiers in which saturation limiting in plate and grid is employed to produce a rectangular wave from a sine wave. The output of the final limiter 28 is of a constant amplitude but its phase is varying with the modulation, as must be the case for the phase modulation component of the single sideband signal. The output of the final limiter 28 is fed to the driver 13. The driver 13 is arranged as a class C amplifier and is tuned by a variable capacitor 32. The output of the driver 13, the amplified phase modulation component, is then fed to the grid of the power or final radio frequency amplifier stage 14 over an electrical path including R.F. coupling capacitor 33, lead 34 and series-connected R.F. choke 35 and high frequency grounding capacitor 36. The term ground is to be understood in the specification as referring to a point of fixed or zero alternating reference potential.

The amplitude modulation component channel includes the envelope detector 15 arranged as a half-wave diode vacuum tube rectifier. The detector 15 removes the amplitude modulation component or envelope from the single sideband signal. A positive going D.C. signal having a form identical to the envelope of the single sideband signal at the output of the generator 10 shown in FIGURE 3 is directly coupled from the detector 15 to the grid of a first audio frequency linear amplifier 37. A resistance-capacitance circuit 65 is connected between the detector 15 and the amplifier 37 having a time constant such that radio frequency components are filtered out and only the envelope or audio component is fed to the amplifier 37. The amplifier 37 functions as a D.C. amplifier and particularly is arranged for class A operation. A negative voltage is normally present on the grid of the amplifier 37 by the action of the unbypassed cathode resistor 38. A fixed value of plate current flows in the plate circuit, resulting in a fixed voltage drop across the load resistor 39. When the positive going D.C. voltage is applied to the grid of amplifier 37, it cancels part of the negative bias applied to the grid and makes the grid more positive (or less negative) than before. This change in grid voltage permits a greater plate current to flow. In this manner, the amplifier 37 acts as a D.C. amplifier.

The output of the amplifier 37 is direct coupled to a second audio frequency linear amplifier 40 which is also arranged for class A operation. A negative voltage is normally present on the grid of the amplifier 40 as a result of the biasing battery 41 poled in the direction shown and the unbypassed cathode resistor 42 such that a steady value of plate current flows. This action causes a fixed voltage drop across load resistor 43. When a negative going D.C. signal voltage resulting from increased current flow in the plate circuit of amplifier 37 is applied across resistor 39, the applied signal continues as a steady voltage drop across resistor 39, increasing the negative bias on the grid of amplifier 40. The net bias then changes to a new value, causing decreased current flow in the plate circuit of amplifier 40 and, therefore, a smaller voltage drop across resistor 43. The decrease in plate current is sustained as long as the input signal exists at the corresponding level that caused plate current to decrease, and, therefore, amplifier 40 functions as a D.C. amplifier.

The output of the amplifier 40 is direct coupled to a linear cathode-follower modulator stage 44 which is also arranged by means of an unbypassed cathode resistor 45 for class A operation. The D.C. signal voltage output is direct coupled from the cathode of modulator 44 to the grid of amplifier 14 over an electrical path including three series connected glow discharge tubes 46, 47 and 48, R.F. choke 35 grounded by capacitor 36. While a positive voltage appears at the cathode of modulator 44, a negative bias is required at the grid of amplifier 14. Glow discharge tubes 46, 47 and 48 are used in that such tubes are characterized by a voltage drop independent of current, resulting, in effect, in the subtraction of a constant voltage from the voltage at the cathode of modulator 44. The glow discharge tubes 46, 47 and 48 may be neon gas tubes identified in the art by the designation OD3. Each tube causes a constant voltage drop of, for example, 150 v. such that point 49 is always at a —450 v. with respect to point 50. As a result of this action, an audio signal appearing in the cathode circuit of modulator 44 is applied as a correspondingly varying negative D.C. signal voltage in series with the radio frequency excitation present at the grid of the amplifier 14. While the tubes 46, 47 and 48 exhibit low impedance to low audio frequencies, the tubes 46, 47 and 48 may not have a constant voltage drop for high audio frequencies due to higher internal impedance. Capacitor 51 connected across tubes 46, 47 and 48 functions as a path for high audio frequencies from point 49 to point 50. Starting resistors 52, 53 function to insure that all three tubes 46, 47 and 48 are lit at the same time.

Since direct coupling is used throughout the amplitude modulation component channel, the amplitude modulation component including the average amplitude or D.C. component will be applied to the grid of amplifier 14 which is normally biased below cut-off. The wave shape of the signal energy so applied will be identical to the envelope of the single sideband signal appearing at the output of generator 10 whether tone or voice transmission is involved.

As is understood in grid-bias modulation, the amplitude modulation component varies the grid bias, which in turn varies the power output of the radio frequency amplifier 14. The average level of the grid bias will be a function of the average amplitude of the amplitude modulation component. This variation in power output causes a modulated wave to be produced which is an amplified copy of the single sideband signal appearing at the output of generator 10 shown in FIGURE 3. The output signal of amplifier 14 is fed to a resonant circuit 54 which is tuned by a variable capacitor 55 to the selected single sideband signal. The high power single sideband signal is transmitted by the antenna 17 coupled to the resonant circuit 54.

In order to reduce nonlinear distortions introduced within the amplifier 14, a portion of the output signal is fed from the resonant circuit 54 to the feedback envelope detector 18 over an electrical path including R.F. coupling capacitor 56 and a variable volume control capacitor 57. The detector 18 includes a half-wave diode vacuum tube rectifier and functions to produce a negative feedback having a wave shape corresponding to the envelope of the output signal. The negative feedback is fed from the detector 18 through a resistance-capacitance circuit 66 to the cathode circuit of audio amplifier 37 over an electrical path including lead 58 and resistor 59 across which the feedback voltage is developed. The circuit 66 functions to filter out radio frequency components and only the envelope or audio component is fed over the feedback path. The signal fed back to the amplifier 37 is one hundred and eighty degrees out of phase with the input signal applied thereto from the detector 15 such that the voltage fed back opposes the input signal voltage. In other words, the amplitude of the voltage swing between grid and cathode is reduced by the amount of the negative feedback. This action causes the distortion component of the feedback voltage to be amplified along with the input signal. The amplified distortion component will tend to cancel the distortion component introduced within the amplifier 14, and the output signal of the amplifier 14 will be practically free of distortion.

A 500 watt single sideband transmitter working at a 4 mc./s. region and based on the arrangement of the invention shown in FIGURE 4 has been constructed. Tests made with two tone equal amplitude signal input resulted in maximum amplitude of spurious radiations 37 db below each tone; the peak efficiency was 60%. With high power tubes having higher ratio of plate to screen voltage, efficiency would go up to 70%. The average efficiency was 47% and quiescent or stand by current was zero. Most of the distortion was found to occur at very low output levels. To linearize the transfer characteristics of the grid-bias modulated stage 14, 14 db of negative envelope feedback was applied. Since grid-bias modulation is used, the amplifier 14 being normally biased below cut-off, stand-by plate dissipation was zero.

Figure 5:
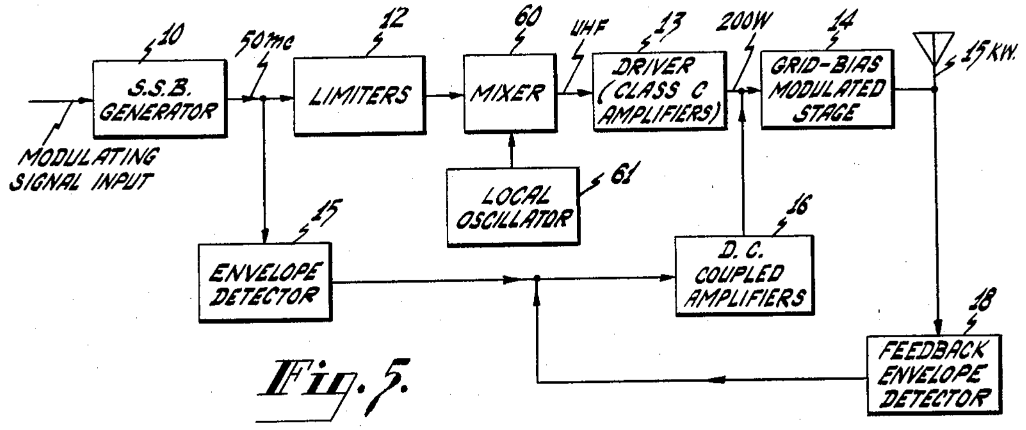
FIGURE 5 is a block diagram of a modification.

A modification of the invention for use in high power UHF single sideband transmitters is shown in FIGURE 5. A one watt excitation signal from the generator 10 at about 50 mc. is detected by detector 15 for envelope information in the manner outlined above. The phase information is handled through a translator from 50 mc. to ultra high frequencies including a mixer 60 and a local oscillator 61. The translator is followed by class C amplifiers up to the grid-bias modulated stage 14. The envelope information is amplified and applied to the modulated stage 14 as grid bias modulation. Higher power could be achieved by the addition of a class B high power amplifier at the output of the modulated stage 14, the added stage being included in the envelope feedback loop. The inherent nonlinear tube characteristics are corrected even if the tube is used with a very low quiescent current.

What is claimed is:

1. In a transmitter, means for generating a complex wave which is amplitude modulated and phase modulated by intelligence to be transmitted, means for eliminating amplitude variations from said wave to provide a resultant phase modulated wave, means for amplifying said resultant wave, means for detecting the amplitude modulation envelope of said complex wave, a direct current amplifier coupled to said detecting means over a direct current path for amplifying said detected envelope, a grid-bias modulated stage having an input circuit coupled to said amplifying means and over a direct current path to said direct current amplifier to amplitude modulate said amplified resultant phase modulated wave with said amplified detected amplitude modulation envelope, and means coupled between said stage and said direct current amplifier to alter the operation of said amplifier in response to said detected envelope according to the output of said stage.

2. In a transmitter, means for generating a complex wave at a given frequency which is amplitude modulated and phase modulated by intelligence to be transmitted, a limiter coupled to receive a portion of the output of said generating means to provide a resultant phase modulated wave at the limiter output, a non-linear amplifier coupled to said limiter output, an amplitude modulation detector coupled to receive the remaining portion of the output of said generating means, a linear direct current amplifier directly coupled to said detector, a grid-bias modulated stage having an input circuit coupled to the output of said nonlinear amplifier and directly coupled to the output of said direct current amplifier to amplitude modulate said amplified resultant phase modulated wave with said amplified detected amplitude modulation, whereby a resultant amplitude modulated and phase modulated wave at said given frequency is provided at the output of said stage, and means connected between the output of said stage and said direct current amplifier for detecting the amplitude modulation envelope of said last-mentioned resultant wave to provide a negative feedback from said stage to said direct current amplifier, said last-mentioned means serving to reduce nonlinear distortion introduced within said stage.

3. In combination, means for generating from a source of intelligence a complex wave which is phase modulated and amplitude modulated, an output amplifier having at least a plate, cathode and grid, a limiter coupled to receive a portion of the output of said generating means to provide a resultant phase modulated wave at said limiter output, a nonlinear amplifier coupled to said limiter output and arranged to apply said amplified phase modulated wave to said grid, an amplitude modulation envelope detector coupled to receive the remaining portion of the output of said generating means, a linear direct current amplifier coupled to said detector over a direct current path and arranged to amplify and then to apply said amplified detected amplitude modulation envelope including the average amplitude component to said grid over a further direct current path, said output amplifier being operated by grid-bias modulation to provide a resultant phase modulated and amplitude modulated wave representative of said complex wave.

4. In a transmitter, means for generating a single sideband signal which is phase modulated and amplitude modulated by intelligence to be transmitted, an output amplifier having at least a plate, cathode and grid, means for eliminating amplitude variations from said signal to provide a resultant phase modulated wave, means for amplifying said resultant wave and for applying said resultant amplified phase modulated wave to said grid, means for detecting the amplitude modulation envelope of said signal, a direct current amplifier coupled to said detecting means over a direct current path for amplifying and then applying said amplified detected amplitude modulation envelope including the average amplitude component over a further direct current path to said grid, said output amplifier being operated by grid-bias modulation to amplitude modulate said amplified resultant phase modulated wave with said amplified detected amplitude modulation envelope to provide a resultant phase modulated and amplitude modulated wave representative of said signal, and means coupled between said plate and said direct current amplifier to alter the operation of said direct current amplifier according to the envelope of said resultant phase and amplitude modulated wave.

5. In a transmitter, means for generating a single sideband signal at a given frequency which is phase modulated and amplitude modulated by intelligence to be transmitted, an output radio frequency amplifier having at least a plate, cathode and control grid, a limiter coupled to receive a portion of the output of said generating means to provide a resultant phase modulated wave at the limiter output, a nonlinear amplifier coupled to said limiter output for applying said amplified phase modulated wave to said grid, said limiter and nonlinear amplifier being broadband, an amplitude modulation envelope detector coupled to receive the remaining portion of the output of said generating means, a linear direct current amplifier directly coupled to said detector for applying said amplified detected amplitude modulation envelope including the average amplitude component over a direct coupling to said grid, said detector and direct current amplifier being broadband, said output amplifier being responsive to said amplified phase modulated wave and to said amplified detected amplitude modulation envelope including said average amplitude component to provide a resultant phase modulated and amplitude modulated wave at said given frequency representative of said signal, and an amplitude modulation envelope detector connected between the output of said output amplifier and said direct current amplifier for detecting the amplitude modulation envelope of said last-mentioned resultant wave to provide a negative feedback from said output amplifier to said direct current amplifier, whereby nonlinear distortions introduced within said output amplifier are reduced.

6. In combination, a source of single sideband waves, a limiter connected to said source to limit waves derived therefrom, a detector connected to said source to detect waves derived from said source and to produce a variable unidirectional voltage with amplitude variations corresponding to the envelope of the detected single sideband waves, a high frequency tube having an input electrode and an output circuit, circuits for feeding limited waves derived from said limiter to said input electrode, whereby high frequency current is caused to flow in said output circuit, and a direct current circuit for applying variable, unidirectional voltages derived from said detector to said input electrode, the high frequency currents produced in said output circuit being varied in amplitude in accordance with the variable unidirectional voltage derived from said detector and applied through said direct current circuit to said input electrode.

7. In combination, a source of single sideband waves, a limiter connected to said source to limit waves derived from said source, a high frequency amplifier tube connected to said limiter and amplifying high frequency waves derived from said limiter, said tube having a control electrode, a detector connected to said source to detect waves therefrom and to produce a direct current voltage representative of the envelope of the single sideband waves, a direct current amplifier connected to and amplifying the direct current voltage produced by said detector, a direct current circuit including a plurality of series connected glow discharge tubes connecting said direct current amplifier to said control electrode of said tube for subjecting the control electrode to the variable direct current voltage amplified by said direct current amplifier and thereby varying the amplitude of the high frequency waves amplified by said tube.

8. In combination, a source of single sideband waves, a limiter connected to said source to limit waves from said source, a detector connected to said source to detect waves from said source so as to produce a unidirectional direct current voltage varying in amplitude in accordance with the amplitude modulation component of the single sideband waves, a tube having control and output electrodes, a second source of regulated biasing voltage, a circuit including a plurality of series-connected two-element glow discharge tubes connected to said detector and said second source to combine the variable unidirectional direct current voltage and the voltage supplied by said second source, a direct current circuit to apply the combined voltages from said combining circuit to said control electrode, a circuit connected to said limiter to apply limited waves produced by said limiter to said control electrode, and an output circuit connected to said output electrode of said tube.

9. In a transmitter, a source of a complex wave of a given frequency which is amplitude modulated and phase modulated by intelligence to be transmitted, a limiter coupled to receive a portion of the complex wave from said source to provide a resultant phase modulated wave at the limiter output, a nonlinear amplifier coupled to said limiter output, an amplitude modulation detector coupled to receive the remaining portion of the complex wave from said source, a linear direct current amplifier coupled to said detector over a direct current path, an amplifying stage having an input circuit coupled to the output of said nonlinear amplifier and over a direct current path to the output of said direct current amplifier to amplitude modulate the amplified resultant phase modulated wave with the amplified detected amplitude modulation, whereby a resultant amplitude modulated and phase modulated wave at said given frequency is provided at the output of said stage, and means connected between the output of said stage and said direct current amplifier for detecting the amplitude modulation envelope of said last-mentioned resultant wave to provide a negative feedback from said stage to said direct current amplifier, said last-mentioned means serving to reduce nonlinear distortion introduced within said stage.

10. In combination, a source of a complex wave which is amplitude modulated and phase modulated by intelligence to be transmitted, means for eliminating amplitude variations from said wave to provide a resultant phase modulated wave, means for amplifying said resultant wave, means for detecting the amplitude modulation envelope of said complex wave, a direct current amplifier coupled to said detecting means over a direct current path for amplifying said detected envelope, an output amplifying stage having an input circuit coupled to said amplifying means and over a direct current path to said direct current amplifier to amplitude modulate said amplified resultant phase modulated wave with said amplified detected amplitude modulation envelope, and means coupled between said stage and said direct current amplifier to alter the operation of said direct current amplifier in response to said detected envelope according to the envelope of the output wave of said stage, whereby distortion introduced in said output wave by said stage is reduced.

References Cited in the file of this patent

UNITED STATES PATENTS

| | | |
|---|---|---|
| 1,982,558 | Whitman | Nov. 27, 1934 |
| 2,261,643 | Brown | Nov. 4, 1941 |
| 2,654,072 | Meisenheimer | Sept. 29, 1953 |
| 2,666,133 | Kahn | Jan. 12, 1954 |
| 2,761,105 | Crosby | Aug. 28, 1956 |
| 2,774,041 | Finch et al. | Dec. 11, 1956 |
| 2,793,349 | Crosby | May 21, 1957 |
| 2,874,222 | Jager | Feb. 17, 1959 |